United States Patent
Lim et al.

(10) Patent No.: US 8,056,782 B2
(45) Date of Patent: Nov. 15, 2011

(54) CROSS BAR OF ROOF CARRIER FOR VEHICLES

(75) Inventors: Kyoon Soo Lim, Suwon-si (KR); Chang Tae Lee, Daegu (KR)

(73) Assignees: Hyundai Motor Company, Seoul (KR); Kia Motors Corporation, Seoul (KR); Eco-Plastic Corporation, Gyeongju-Si (KR)

( * ) Notice: Subject to any disclaimer, the term of this patent is extended or adjusted under 35 U.S.C. 154(b) by 571 days.

(21) Appl. No.: 12/276,247

(22) Filed: Nov. 21, 2008

(65) Prior Publication Data

US 2009/0200349 A1    Aug. 13, 2009

(30) Foreign Application Priority Data

Feb. 12, 2008  (KR) .................. 10-2008-0012687

(51) Int. Cl.
*B60R 9/045* (2006.01)
(52) U.S. Cl. .................................................. 224/321
(58) Field of Classification Search .................. 224/321
See application file for complete search history.

(56) References Cited

U.S. PATENT DOCUMENTS

| | | | | |
|---|---|---|---|---|
| 5,170,920 A * | 12/1992 | Corrente et al. | ............. | 224/321 |
| 5,924,614 A * | 7/1999 | Kuntze et al. | ................. | 224/321 |
| 6,068,169 A * | 5/2000 | Aftanas | ......................... | 224/321 |
| 6,131,782 A * | 10/2000 | De Silva et al. | .............. | 224/321 |
| 6,158,639 A * | 12/2000 | De Silva et al. | .............. | 224/321 |
| 6,779,696 B2 * | 8/2004 | Aftanas et al. | ................ | 224/315 |
| 7,766,200 B2 * | 8/2010 | Park et al. | ...................... | 224/315 |
| 7,802,707 B2 * | 9/2010 | Aftanas | ......................... | 224/321 |
| 7,806,306 B2 * | 10/2010 | Aftanas | ......................... | 224/321 |
| 7,926,685 B2 * | 4/2011 | Aftanas | ......................... | 224/321 |
| 2008/0128461 A1 * | 6/2008 | Lee | .............................. | 224/321 |

* cited by examiner

*Primary Examiner* — Justin Larson
(74) *Attorney, Agent, or Firm* — Morgan, Lewis & Bockius LLP

(57) ABSTRACT

Disclosed herein is a cross bar of a roof carrier for vehicles, provided between side bars of a roof so as to load cargo, and having no wire, thus reducing a manufacturing cost. The cross bar includes first and second brackets provided on opposite ends of a cross-bar body. A first locking pin is provided on one end of the cross-bar body in such a way as to be retracted into and ejected from the first bracket. A second locking pin is connected to the other end of the cross-bar body via a power transmission unit, and moves in a direction opposite the moving direction of the cross-bar body to be retracted into and ejected out from the second bracket. A lever is provided on the first bracket. A body elastic part is provided between the cross-bar body and the second bracket, and provides restoring force to the cross-bar body.

15 Claims, 4 Drawing Sheets

[FIG 1]
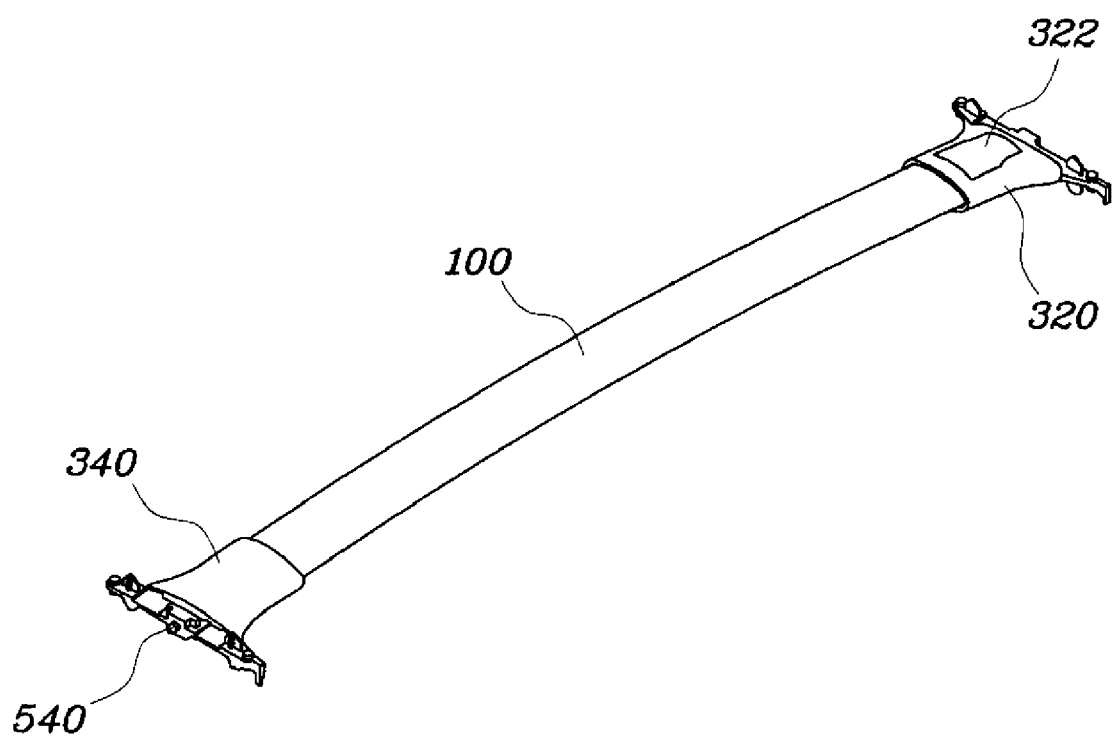

[FIG 2A]
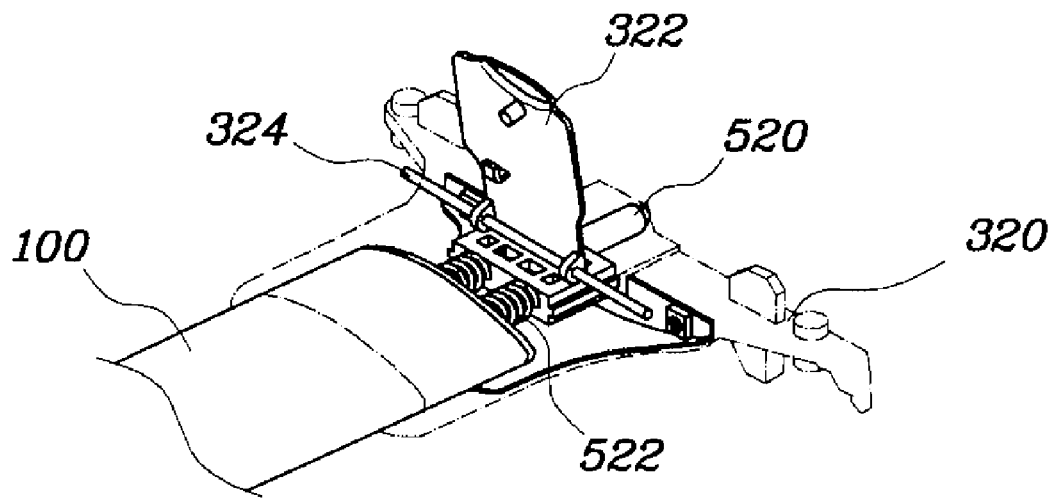
[FIG 2B]
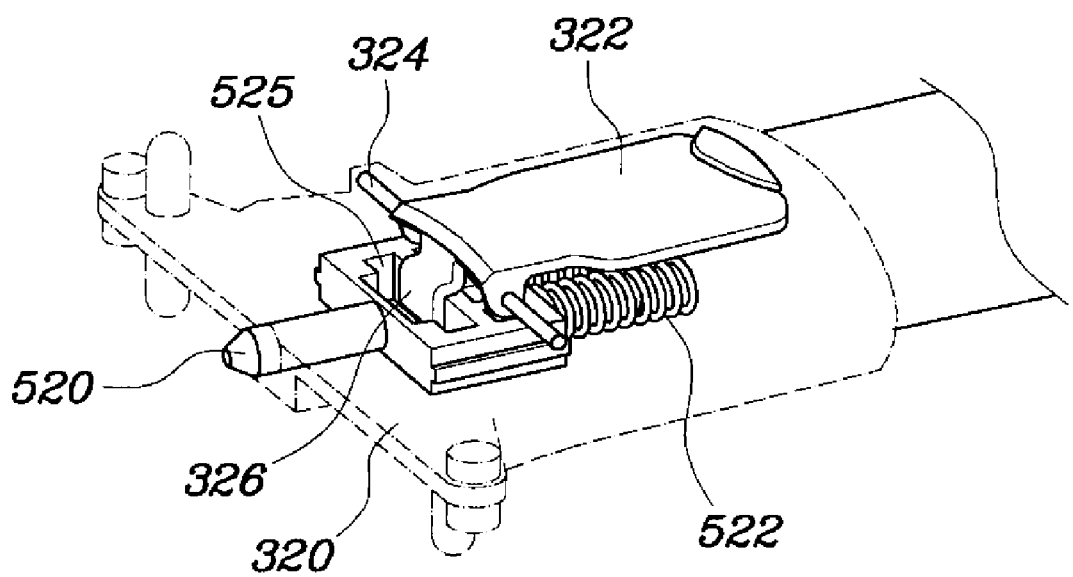

[FIG 2C]
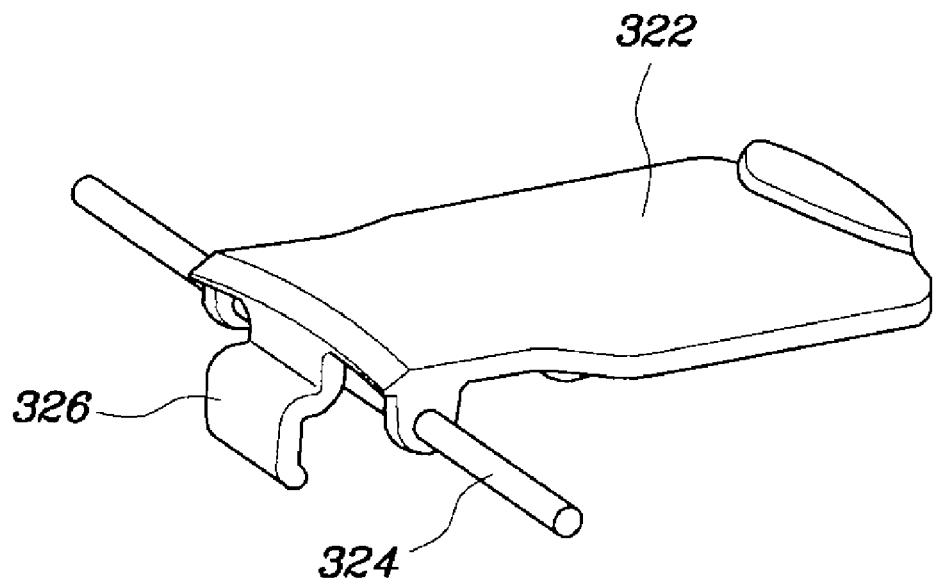
[FIG 3]
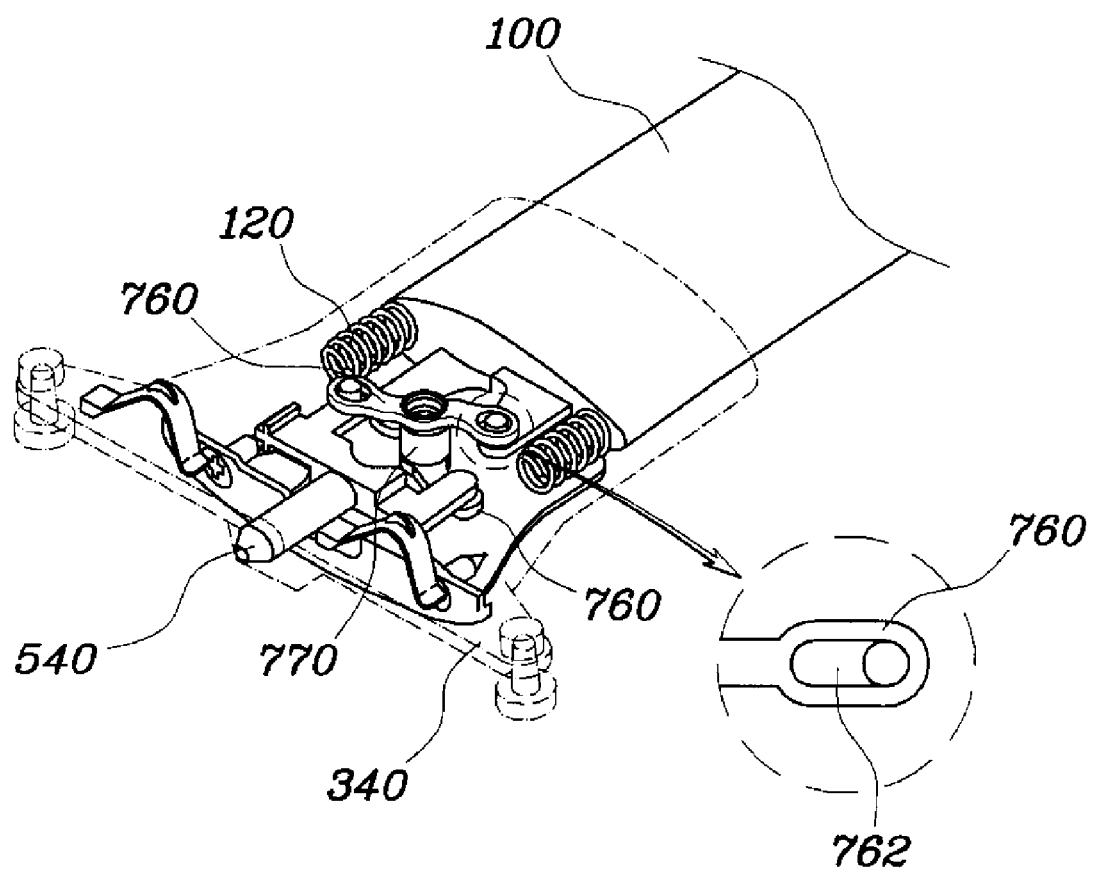

[FIG 4]
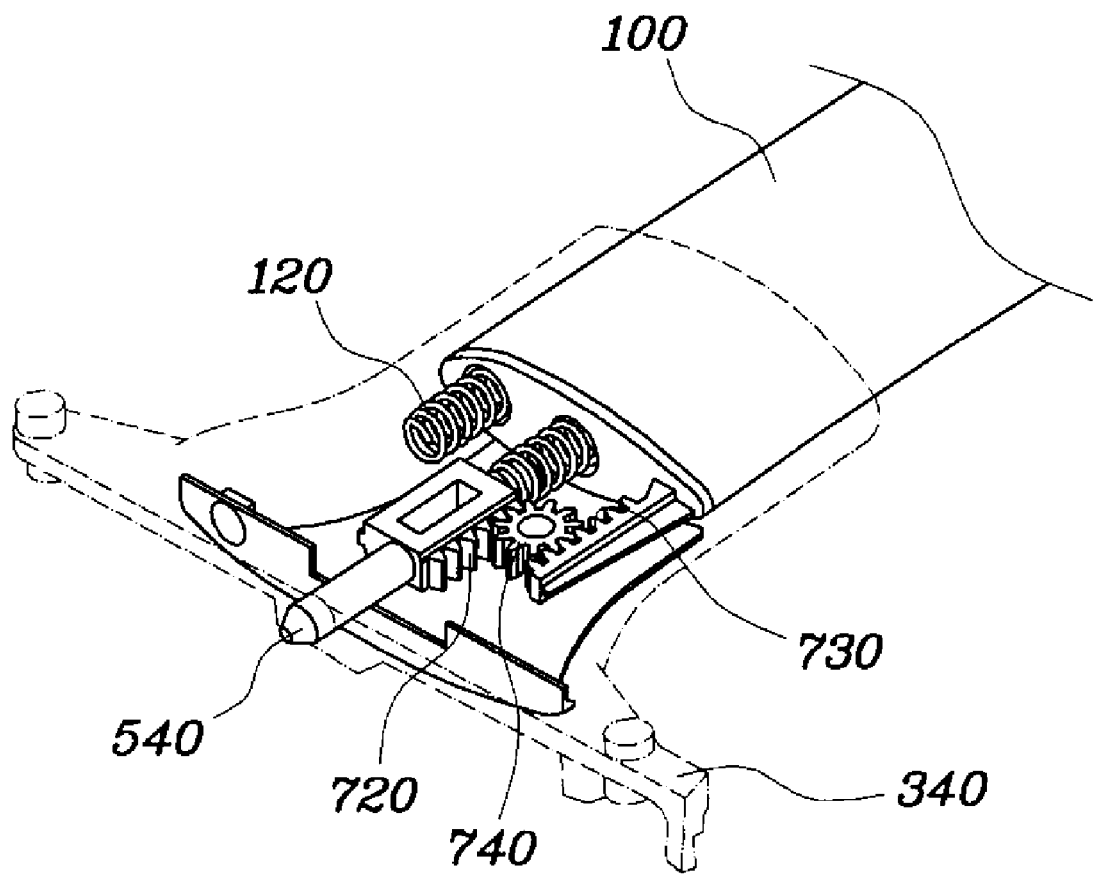

CROSS BAR OF ROOF CARRIER FOR VEHICLES

CROSS-REFERENCE TO RELATED APPLICATIONS

This application claims priority to Korean Application No. 10-2008-0012687, filed on Feb. 12, 2008, the disclosure of which is incorporated herein by reference.

BACKGROUND OF THE INVENTION

1. Field of the Invention

The present invention relates to a cross bar of a roof carrier for vehicles, and more particularly, a cross bar of a roof carrier for vehicles which constitutes the roof carrier together with side bars so as to load cargo or equipment on a roof of a vehicle.

2. Description of the Related Art

Recently, recreational vehicles and vans have been widely used for leisure activities. Because of the limited internal space in the vehicles, a variety of cargo or leisure equipment is loaded on the roof thereof. To this end, a roof carrier is mounted on the roof of a vehicle.

The roof carrier for vehicles includes side bars which are provided on both sides of the roof in the longitudinal direction of a vehicle, and cross bars which are transversely mounted between the side bars. The cross bars are secured to the side bars so as to hold cargo at a predetermined position. When it is required to change the position of each cross bar, it is necessary to release the cross bar from the side bars. Thus, the roof carrier is constructed so that a passenger adjusts the position of the cross bar to be appropriate to the size or length of cargo, and secures the cross bar at the adjusted position between the side bars.

In a conventional roof carrier for vehicles, side bars are mounted to both sides of a roof of a vehicle in such a way as to extend in the longitudinal direction of the vehicle, and cross bars are installed between the side bars. Brackets are coupled to opposite ends of each cross bar, and locking pins protrude out from the corresponding brackets. A plurality of pin insert holes is formed in the inner surfaces of the side bars at regular intervals such that the corresponding locking pins are inserted into the pin insert holes. The locking pins of the cross bar are ejected or retracted to be locked to or released from associated pin insert holes. Thus, after the locking pins are retracted into the brackets, the position of the cross bar is adjusted. Thereafter, the locking pins are ejected, thus securing the cross bar at the adjusted position. Of course, the cross bar slides along rails which are provided on the inner surfaces of the side bars.

The locking pins comprise a left locking pin and a right locking pin. The cross bar has on opposite ends thereof the brackets, and cam-type levers are provided in respective brackets, and the locking pins are installed in the corresponding brackets. Here, the left lever is connected to the right locking pin via a first wire, while the right lever is connected to the left locking pin via a second wire. The left lever is a cam which is fastened via a hinge shaft. When the left lever is pulled, the left locking pin is pulled by the movement of the cam, so that the left locking pin is retracted from an associated pin insert hole. At this time, the right locking pin is also pulled by the first wire to be retracted from an associated pin insert hole. That is, by pulling only the left lever, both the locking pins are pulled towards the cross bar, so that the locking pins are released from the side bars. Even when the right lever is pulled, the cross bar is operated in the same manner. Further, the two wires are connected at the centers thereof to each other via a spring, thus maintaining the tension and restoring force of the wires.

However, the conventional cross bar of the roof carrier for vehicles is problematic in that the plurality of wires, the spring, and the levers are used, so that the construction of the cross bar is complicated, and the manufacturing cost is high. Further, after the wires have been used for a lengthy period of time, the durability of a product is reduced due to the deterioration of the wires.

Further, the conventional cross bar of the roof carrier for vehicles is problematic in that each lever comprises a cam, so that the cross bar cannot be operated smoothly. Furthermore, each bracket does not completely cover a cam part of the corresponding lever, and thus the durability of parts in the bracket is low.

The information disclosed in this Background of the Invention section is only for enhancement of understanding of the background of the invention and should not be taken as an acknowledgement or any form of suggestion that this information forms the prior art that is already known to a person skilled in the art.

SUMMARY OF THE INVENTION

Embodiments of the present invention provides a cross bar of a roof carrier for vehicles, which eliminates a wire structure of the conventional cross bar, and in which a lever is provided on only one side of the cross bar, thus increasing the durability of parts, reducing the manufacturing cost, and ensuring smooth operation.

In order to accomplish the above object, an exemplary embodiment of the present invention provides a cross bar of a roof carrier for vehicles, including first and second brackets provided on first and second ends of a cross-bar body which is transversely mounted between side bars provided on both sides of a roof, a first locking pin provided on the first end of the cross-bar body, and moving in a longitudinal direction of the cross-bar body along with the cross-bar body to be retracted into or ejected from the first bracket, a second locking pin connected to the second end of the cross-bar body via a power transmission unit and moving in a direction opposite a moving direction of the cross-bar body to be retracted into or ejected out from the second bracket, a lever provided on the first bracket, and moving the cross-bar body towards the second bracket such that both the first and second locking pins are retracted into the first and second brackets respectively when the lever is opened, and at least a body elastic part provided between the cross-bar body and the second bracket, and applying restoring force to the cross-bar body to eject the first and second locking pins respectively when the lever is closed.

The power transmission unit may comprise two crossing links, an intersection of the links being pivotally coupled to the second bracket via a hinge, each of the links being coupled to the cross-bar body and the second locking pin in such a way that the links cross each other at the intersection. Each end of two crossing links may comprise a longitudinal hole so that the crossing links rotates each other about the hinge at a predetermined angle in opposite direction when the cross-bar moves. One end of the body elastic part may be coupled to the cross-bar body and the other end of the body elastic part is supported by the second bracket. One end of the body elastic part may be supported by the cross-bar body and the other end of the body elastic part is coupled to the second bracket.

Another exemplary embodiment of the present invention provides a cross bar of a roof carrier for vehicles, wherein the power transmission unit comprises, rack gears provided on the second locking pin and the cross-bar body respectively in such a way as to face each other; and a pinion gear provided between the rack gears to engage with the rack gears. One end of first body elastic part of the at least one body elastic part may be coupled to the cross-bar body and the other end of the first body elastic part is supported by the second locking pin. One end of second body elastic part of the at least one body elastic part may be coupled to the cross-bar body and the other end of second body elastic part is supported by the second bracket. One end of second body elastic part of the at least one body elastic part may be supported by the cross-bar body and the other end of second body elastic part is coupled to the second bracket.

In further another exemplary embodiment the present invention may provide a cross bar of a roof carrier for vehicles, wherein end of first body elastic part of the at least one body elastic part is supported by the cross-bar body and the other end of the first body elastic part is coupled to the second locking pin. One end of second body elastic part of the at least one body elastic part may be coupled to the cross-bar body and the other end of second body elastic part is supported by the second bracket. One end of second body elastic part of the at least one body elastic part may be supported by the cross-bar body and the other end of second body elastic part is coupled to the second bracket.

In further another exemplary embodiment the present invention may provide a cross bar of a roof carrier for vehicles, wherein the lever may be hinged to a receiving hole of the first bracket in such a way that an end of the lever is hooked to the receiving hole of the first locking pin, and is pulled by a user so that the first locking pin pushes the cross-bar body to release the cross bar from the side bars. The end of the lever may be offset from the hinged portion of the lever with a predetermined distance.

In another exemplary embodiment of the present invention, a pin elastic part may be provided between the first locking pin and the cross-bar body, and may provide ejecting force to the first locking pin when the cross-bar body is restored to an original position thereof.

BRIEF DESCRIPTION OF THE DRAWINGS

The above and other features of the present invention will now be described in detail with reference to certain exemplary embodiments thereof illustrated the accompanying drawings which are given hereinbelow by way of illustration, and thus are not limitative of the present invention, and wherein:

FIG. 1 is a perspective view showing a cross bar of a roof carrier for vehicles, according to the present invention;

FIG. 2A is a perspective view showing the state in which a lever of the cross bar of the roof carrier for vehicles shown in FIG. 1 is mounted;

FIG. 2B is another perspective view showing the state in which the lever of the cross bar of the roof carrier for vehicles shown in FIG. 1 is mounted;

FIG. 2C is a perspective view showing the lever included in the cross bar of the roof carrier for vehicles shown in FIG. 1;

FIG. 3 is a perspective view showing a power transmission unit for the second locking pin included in the cross bar of the roof carrier for vehicles, according to an embodiment of the present invention; and FIG. 4 is a perspective view showing a power transmission unit for the second locking pin included in the cross bar of the roof carrier for vehicles, according to another embodiment of the present invention.

It should be understood that the appended drawings are not necessarily to scale, presenting a somewhat simplified representation of various preferred features illustrative of the basic principles of the invention. The specific design features of the present invention as disclosed herein including, for example, specific dimensions, orientations, locations, and shapes will be determined in part by the particular intended application and use environment.

In the figures, reference numbers refer to the same or equivalent parts of the present invention throughout the several figures of the drawing.

DESCRIPTION OF THE PREFERRED EMBODIMENTS

Hereinafter, an exemplary cross bar of a roof carrier for vehicles according to the preferred embodiment of the present invention will be described with reference to the accompanying drawings.

Referring to FIG. 1, the cross bar includes a cross-bar body 100, which is transversely mounted between side bars (not shown) provided on both sides of a roof. First and second brackets 320 and 340 are coupled to each distal ends of the cross-bar body 100. locking pins 520 and 540 protrude out from each of the brackets 320 and 340, and is selectively locked to the corresponding side bar. A lever 322 is provided on the first bracket 320, and functions to provide actuating force.

FIGS. 2A to 2C are perspective views showing the lever. Referring to FIG. 2A, the lever 322 is configured to be hooked to the first locking pin 520, which is provided on the first bracket 320. In detail, the lever 322 hinged to the first bracket 320 by a hinge 324 is hooked at its end comprising a hook 326 to a receiving hole 525 of the first locking pin 520. At normal state, the lever 322 is closed to the first bracket 320, and thereby the first locking pin 520 protrudes out. Meanwhile, when the lever 322 is pulled upwards, the hook 326 of the lever 322 rotates around the hinge 324, thus pushing the first locking pin 520 into the first bracket 320. The cross-bar body 100 is pushed leftwards by the first locking pin 520 in FIG. 2A. Thereby, a second locking pin 540, which will be described below in detail, is also moved into the second bracket 340.

Further, it is obvious that the cross-bar body 100, positioned inside the first and second brackets 320 and 340, must be respectively movable leftwards and rightwards by a predetermined distance. To this end, the cross-bar body 100 is slidably coupled to first and second brackets 320 and 340.

The lever 322 will be described in detail with reference to FIGS. 2B and 2C. The lever 322 is bent at the end thereof downwards, thus forming a hook 326. The hook 326 is configured to be inserted into a receiving hole 525 of the first locking pin 520. The lever 322 rotates around the hinge 324 coupled to the first bracket 320. As the lever 322 rotates upwards, the hook 326 pushes the first locking pin 520 into the first bracket 320.

Preferably, in order to provide ejecting force to the first locking pin 520 when the cross-bar body 100 is restored to an original position thereof, a pin elastic part 522 is provided to rear portion of the first locking pin 520 and thereby the pin elastic part 522 is disposed between the first locking pin 520 and the cross-bar body 100. As one example of the pin elastic part 522, a coil spring may be used. Thus, the pin elastic part 522 allows the first locking pin 520 to be more stably ejected by restoring force of the pin elastic part 522 when the pulled lever 322 is released from a user's hand and closed.

Hereinafter, power transmission unit to transmit power to the second locking pin will be explained.

FIGS. 3 and 4 show power transmission units for the second locking pin, according to embodiments of the present invention, in which FIG. 3 shows a link assembly and FIG. 4 shows a gear assembly.

Each power transmission unit serves to transmit power to the second locking pin 540 such that it moves in a direction opposite the moving direction of the cross-bar body 100. Unlike the prior art, the cross-bar body 100 according to the present invention has no wire, and is constructed so that the cross-bar body 100 itself moves.

In a detailed description, when the lever 322 is pulled so as to push the first locking pin 520 into the first bracket 320, the cross-bar body 100 is pushed towards the second bracket 340 by the first locking pin 520, and the second locking pin 540 is moved in a direction opposite the moving direction of the cross-bar body 100 by the power transmission unit so that the second locking pin 540 is also moved into the second bracket 340.

Since the power transmission unit couples the second locking pin 540 to the cross-bar body 100, both the first locking pin 520 and the second locking pin 540 are retracted into the corresponding first and second brackets 320 and 340 as the user pulls the lever 322, which is provided only on the first bracket 320. Consequently, the cross bar is released from the side bars, so that the cross bar can be slid between the side bars so as to change its position.

When the lever 322 is released from a user's hand, the first and second locking pins 520 and 540 must be ejected. To this end, in an exemplary embodiment of the present invention, the body elastic part 120 is attached to distal end portion of the cross-bar body 100 in the second bracket 340 and thus the body elastic part 120 is interposed between the cross-bar body 100 and the second bracket 340, and applies restoring force. That is, when the lever 322 is released from the user's hand and returns to the closed state, the body elastic part 120 compressed by the movement of the cross-bar body 100, is extended and thus pushes the cross-bar body 100 to the original position thereof. As the cross-bar body 100 returns to the original position thereof, the second locking pin 540 is ejected by the power transmission unit. The first locking pin 520 is also ejected by the cross-bar body 100 and the restored pin elastic part 522. The ejected locking pins 520 and 540 are locked to corresponding pin insert holes in the side bars (not shown), so that the cross bar is secured at the adjusted position. Preferably, the body elastic pan 120 comprises a coil spring.

As an exemplary embodiment of the present invention, the power transmission unit of FIG. 3 is the link assembly. The link assembly includes two crossing links 760. The intersection of the cross links 760 is hinged to the second bracket 340. Each one end portion of the crossing links 760 is coupled to the cross-bar body 100 and each other end portion of the crossing links 760 is coupled to the second pin 540 in such a way that the crossing links 760 cross each other at a hinge 770. The hinge 770 couples the intersection of the crossing links 760 to the second bracket 340. Thus, each link 760 rotates around the hinge 770 in opposite direction, like scissors, so that the second locking pin 540 and the cross bar body 100 may move in opposite directions. A longitudinal hole 762 is formed in an end of each link 760, so that the link 760 rotates around the hinge 770 only at a predetermined angle when the cross-bar body 100 moves.

As another exemplary embodiment of the present invention, the power transmission unit of FIG. 4 is the gear assembly. The gear assembly includes first and second rack gears 720 and 730 and a pinion gear 740. The first and second rack gears 720 are provided respectively on the second locking pin 540 and the cross-bar body 100 in such a way as to face each other. The pinion gear 740 is provided between the first and second rack gears 720 and 730 and engages with the first and second rack gears 720 and 730.

Similarly to the link assembly, the gear assembly moves the cross-bar body 100 and the second locking pin 540 in opposite directions. When the cross-bar body 100 is pushed towards the second bracket 340, the pinion gear 740 rotates along the first and second rack gears 720 and 730. As the pinion gear 740 rotates clockwise in the drawing, the second locking pin 540 is moved into the second bracket 340. Body elastic part 120, for example an coil spring, is interposed between the cross-bar body 100 and the second bracket 340. According to the present invention, two coil springs are used. Preferably, one of the coil springs is interposed between the second locking pin 540 and the cross-bar body 100 so as to stably move the second locking pin 540.

The operation of the cross bar of the roof carrier for vehicles which is constructed as described above will be described below in sequence. At normal state, the first and second locking pins 520 and 540 are protruded out and locked to the side bars. After this state, when the lever 322 is pulled upwards, the first locking pin 520 is moved inwards, and the first locking pin 520 pushes the cross-bar body 100 towards the second locking pin 540 and thereby, conversely, the second locking pin 540 is moved inwards. In this case, the cross bar is released from the side bars. However, when the lever 322 is released from a user's hand, the cross-bar body 100 is returned to its original position by the pin elastic part 522 and the body elastic part 120, and thus the first and second locking pins 520 and 540 are ejected to be locked to the side bars.

As described above, the present invention provides a cross bar of a roof carrier for vehicles, which has no wire structure, thus achieving a simple structure, reducing the manufacturing cost and increasing durability.

Further, the present invention provides a cross bar of a roof carrier for vehicles, in which a lever does not have a cam structure, thus ensuring smooth operation, and in which only one lever is used, thus reducing the manufacturing cost. Further, a bracket is integrated with the lever to completely cover the lever, thus increasing the durability of parts.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A cross bar of a roof carrier for vehicles, comprising:
   first and second brackets provided on first and second ends of a cross-bar body which is transversely mounted between side bars provided on both sides of a roof;
   a first locking pin provided on the first end of the cross-bar body, and moving in a longitudinal direction of the cross-bar body along with the cross-bar body to be retracted into or ejected from the first bracket;
   a second locking pin connected to the second end of the cross-bar body via a power transmission unit, and moving in a direction opposite a moving direction of the cross-bar body to be retracted into or ejected out from the second bracket;
   a lever provided on the first bracket, and moving the cross-bar body towards the second bracket such that both the first and second locking pins are retracted into the first and second brackets respectively when the lever is opened; and at least one body elastic part provided between the cross-bar body and the second bracket, and applying restoring force to the cross-bar body to eject the first and second locking pins respectively when the lever is closed.

2. The cross bar as set forth in claim 1, wherein a pin elastic part is provided between the first locking pin and the cross-bar body, and provides ejecting force to the first locking pin when the cross-bar body is restored to an original position thereof.

3. The cross bar as set forth in claim 1, wherein the lever is hinged to the first bracket in such a way that an end of the lever is hooked to a receiving hole of the first locking pin, and is pulled by a user so that the first locking pin pushes the cross-bar body to release the cross bar from the side bars.

4. The cross bar as set forth in claim 3, wherein the end of the lever is offset from the hinged portion of the lever with a predetermined distance.

5. The cross bar as set forth in claim 1, wherein the power transmission unit comprises two crossing links, an intersection of the links being pivotally coupled to the second bracket via a hinge, each of the links being coupled to the cross-bar body and the second locking pin in such a way that the links cross each other at the intersection.

6. The cross bar as set forth in claim 5, wherein each end of two crossing links comprises a longitudinal hole so that the crossing links rotate about the hinge at a predetermined angle in opposite direction when the cross-bar moves.

7. The cross bar as set forth in claim 6, wherein one end of the at least one body elastic part is coupled to the cross-bar body and the other end of the at least one body elastic part is supported by the second bracket.

8. The cross bar as set forth in claim 6, wherein one end of the at least one body elastic part is supported by the cross-bar body and the other end of the at least one body elastic part is coupled to the second bracket.

9. The cross bar as set forth in claim 1, wherein the power transmission unit comprises:

rack gears provided on the second locking pin and the cross-bar body respectively in such a way as to face each other; and a pinion gear provided between the rack gears to engage with the rack gears.

10. The cross bar as set forth in claim 9, wherein one end of a first body elastic part of the at least one body elastic part is coupled to the cross-bar body and the other end of the first body elastic part is supported by the second locking pin.

11. The cross bar as set forth in claim 10, wherein one end of a second body elastic part of the at least one body elastic part is coupled to the cross-bar body and the other end of second body elastic part is supported by the second bracket.

12. The cross bar as set forth in claim 10, wherein one end of a second body elastic part of the at least one body elastic part is supported by the cross-bar body and the other end of second body elastic part is coupled to the second bracket.

13. The cross bar as set forth in claim 9, wherein one end of a first body elastic part of the at least one body elastic part is supported by the cross-bar body and the other end of the first body elastic part is coupled to the second locking pin.

14. The cross bar as set forth in claim 13, wherein one end of a second body elastic part of the at least one body elastic part is coupled to the cross-bar body and the other end of second body elastic part is supported by the second bracket.

15. The cross bar as set forth in claim 13, wherein one end of a second body elastic part of the at least one body elastic part is supported by the cross-bar body and the other end of second body elastic part is coupled to the second bracket.

* * * * *